United States Patent
Ye et al.

(10) Patent No.: US 11,867,801 B2
(45) Date of Patent: Jan. 9, 2024

(54) VEHICLE INFORMATION DETECTION METHOD, METHOD FOR TRAINING DETECTION MODEL, ELECTRONIC DEVICE AND STORAGE MEDIUM

(71) Applicant: Beijing Baidu Netcom Science and Technology Co., LTD, Beijing (CN)

(72) Inventors: Xiaoqing Ye, Beijing (CN); Xiao Tan, Beijing (CN); Hao Sun, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 283 days.

(21) Appl. No.: 17/354,557

(22) Filed: Jun. 22, 2021

(65) Prior Publication Data
US 2021/0319261 A1    Oct. 14, 2021

(30) Foreign Application Priority Data
Oct. 23, 2020   (CN) .......................... 202011148252.0

(51) Int. Cl.
*G06K 9/62*        (2022.01)
*G06K 9/00*        (2022.01)
(Continued)

(52) U.S. Cl.
CPC ............ *G01S 13/931* (2013.01); *G01S 13/42* (2013.01); *G01S 13/867* (2013.01); *G06F 18/214* (2023.01); *G06F 18/217* (2023.01); *G06F 18/25* (2023.01); *G06N 3/08* (2013.01); *G06T 7/521* (2017.01); *G06T 7/60* (2013.01);
(Continued)

(58) Field of Classification Search
CPC .......... G06T 7/521; G06T 2207/10028; G06V 20/52; G06V 30/248; G06V 2201/07; G06F 18/217; G06F 18/25; G01S 13/42
See application file for complete search history.

(56) References Cited

U.S. PATENT DOCUMENTS

| | | | |
|---|---|---|---|
| 8,704,887 B2 * | 4/2014 | Zeng ...................... | G06V 20/58 |
| | | | 382/104 |
| 11,023,748 B2 * | 6/2021 | Sagong ................ | G06V 20/588 |
| (Continued) | | | |

FOREIGN PATENT DOCUMENTS

| | | |
|---|---|---|
| CN | 109753938 A | 5/2019 |
| CN | 110969064 A | 4/2020 |

OTHER PUBLICATIONS

Dec. 7, 2021—(EP)—EESR—App. No. 21179857.4.
(Continued)

*Primary Examiner* — Gregory M Desire
(74) *Attorney, Agent, or Firm* — Banner & Witcoff, Ltd.

(57) ABSTRACT

A vehicle information detection method, a method for training a detection model, an electronic device and a storage medium are provided, and relates to the technical field of artificial intelligence, in particular to the technical field of computer vision and deep learning. The method includes: performing a first target detection operation based on an image of a target vehicle, to obtain a first detection result for target information of the target vehicle; performing an error detection operation based on the first detection result, to obtain error information; and performing a second target detection operation based on the first detection result and the error information, to obtain a second detection result for the target information.

12 Claims, 10 Drawing Sheets

(51) Int. Cl.
| | |
|---|---|
| *G06K 9/68* | (2006.01) |
| *G01S 13/931* | (2020.01) |
| *G06T 7/521* | (2017.01) |
| *G01S 13/42* | (2006.01) |
| *G01S 13/86* | (2006.01) |
| *G06N 3/08* | (2023.01) |
| *G06T 7/60* | (2017.01) |
| *G06V 20/52* | (2022.01) |
| *G06V 30/24* | (2022.01) |
| *G06F 18/214* | (2023.01) |
| *G06F 18/25* | (2023.01) |
| *G06F 18/21* | (2023.01) |
| *G06V 10/25* | (2022.01) |
| *G06V 10/80* | (2022.01) |
| *G06V 10/44* | (2022.01) |
| *G06V 10/98* | (2022.01) |
| *G06V 20/54* | (2022.01) |
| *G06V 20/64* | (2022.01) |

(52) U.S. Cl.
CPC ............ *G06V 10/25* (2022.01); *G06V 10/454* (2022.01); *G06V 10/80* (2022.01); *G06V 10/98* (2022.01); *G06V 20/52* (2022.01); *G06V 20/54* (2022.01); *G06V 20/64* (2022.01); *G06V 30/248* (2022.01); *G06T 2207/10028* (2013.01); *G06T 2207/30236* (2013.01); *G06V 30/2552* (2022.01); *G06V 2201/00* (2022.01); *G06V 2201/08* (2022.01)

(56) References Cited

U.S. PATENT DOCUMENTS

| | | | | |
|---|---|---|---|---|
| 11,079,492 | B1* | 8/2021 | Stumm | G01C 21/3833 |
| 11,164,031 | B2* | 11/2021 | Sameer | G06T 3/20 |
| 11,221,413 | B2* | 1/2022 | Liang | G01S 17/931 |
| 11,450,063 | B2* | 9/2022 | Choi | G06T 17/10 |
| 11,494,937 | B2* | 11/2022 | Urtasun | G06T 11/60 |
| 2018/0204076 | A1* | 7/2018 | Tripathi | G06V 10/774 |
| 2019/0271550 | A1* | 9/2019 | Breed | F21S 41/13 |
| 2019/0339373 | A1* | 11/2019 | Kahana | G01S 13/931 |
| 2020/0143175 | A1* | 5/2020 | Tan | G06T 7/50 |

OTHER PUBLICATIONS

Wentao Bao et al., "Object-Aware Centroid Voting for Monocular 3D Object Detection", ARXIV.ord, Cornell University Library, 201 OLIN Library Cornell University Ithaca, NY, Jul. 20, 2020.

Jason Ku, et al., "Monocular 3D Object Detection Leveraging Accurate Proposals and Shape Reconstruction", 2019 IEEE/CVF Conference on Computer Vision and Pattern Recognition, IEEE, Jun. 15, 2019, pp. 11859-11868.

Junning Zhang et al., "Monocular 3D vehicle detection with multi-instance depth and geometry reasoning for autonomous driving", Neurocomputing, Elsevier, AMsterdam, NL, vol. 403, May 1, 2020, pp. 182-192.

\* cited by examiner

VEHICLE INFORMATION DETECTION METHOD, METHOD FOR TRAINING DETECTION MODEL, ELECTRONIC DEVICE AND STORAGE MEDIUM

CROSS-REFERENCE TO RELATED APPLICATION

This application claims priority to Chinese patent application No. 202011148252.0, filed on Oct. 23, 2020, which is hereby incorporated by reference in its entirety.

TECHNICAL FIELD

The disclosure relates to the field of computer technology, in particular to the field of artificial intelligence, in particular to the technical field of computer vision and deep learning.

BACKGROUND

At present, in road and driving scenes, accurate detection of vehicle information mainly depends on a laser radar or a millimeter wave radar to detect point cloud data of a vehicle.

SUMMARY

The disclosure provides a vehicle information detection method and apparatus, a method and apparatus for training a detection model.

According to an aspect of the present disclosure, there is provided a vehicle information detection method, including:
  performing a first target detection operation based on an image of a target vehicle to obtain a first detection result for target information of the target vehicle;
  performing an error detection operation based on the first detection result, to obtain error information; and
  performing a second target detection operation based on the first detection result and the error information, to obtain a second detection result for the target information.

According to another aspect of the present disclosure, there is provided a method for training a vehicle information detection model, including:
  obtaining target information of a plurality of vehicles based on radar point cloud data of the plurality of vehicles; and
  training based on the target information of the plurality of vehicles and images of the plurality of vehicles to obtain a vehicle detection model, wherein the vehicle detection model is used for obtaining a detection result for target information of a target vehicle based on an image of the target vehicle.

According to another aspect of the present disclosure, there is provided a vehicle information detection apparatus, including:
  a first target detection module configured for performing a first target detection operation based on an image of a target vehicle, to obtain a first detection result for target information of the target vehicle;
  an error detection module configured for performing an error detection operation based on the first detection result, to obtain error information; and
  a second target detection module configured for performing a second target detection operation based on the first detection result and the error information, to obtain a second detection result for the target information.

According to another aspect of the present disclosure, there is provided an apparatus for training a vehicle information detection model, including:
  a target information determination module configured for obtaining target information of a plurality of vehicles based on radar point cloud data of the plurality of vehicles; and
  a training module configured for training based on the target information of the plurality of vehicles and images of the plurality of vehicles to obtain a vehicle detection model, wherein the vehicle detection model is used for obtaining a detection result for target information of a target vehicle based on an image of the target vehicle.

According to another aspect of the present disclosure, there is provided an electronic device, including:
  at least one processor; and
  a memory communicatively connected to the at least one processor, wherein
  the memory stores instructions executable by the at least one processor, and the instruction is executed by the at least one processor to enable the at least one processor to execute the method provided by embodiments of the present disclosure.

According to another aspect of the present disclosure, there is provided a non-transitory computer-readable storage medium storing computer instructions, wherein the computer instructions cause a computer to execute the method provided by embodiments of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The accompanying drawings are included to provide a better understanding of the scheme and are not to be construed as limiting the disclosure, wherein.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
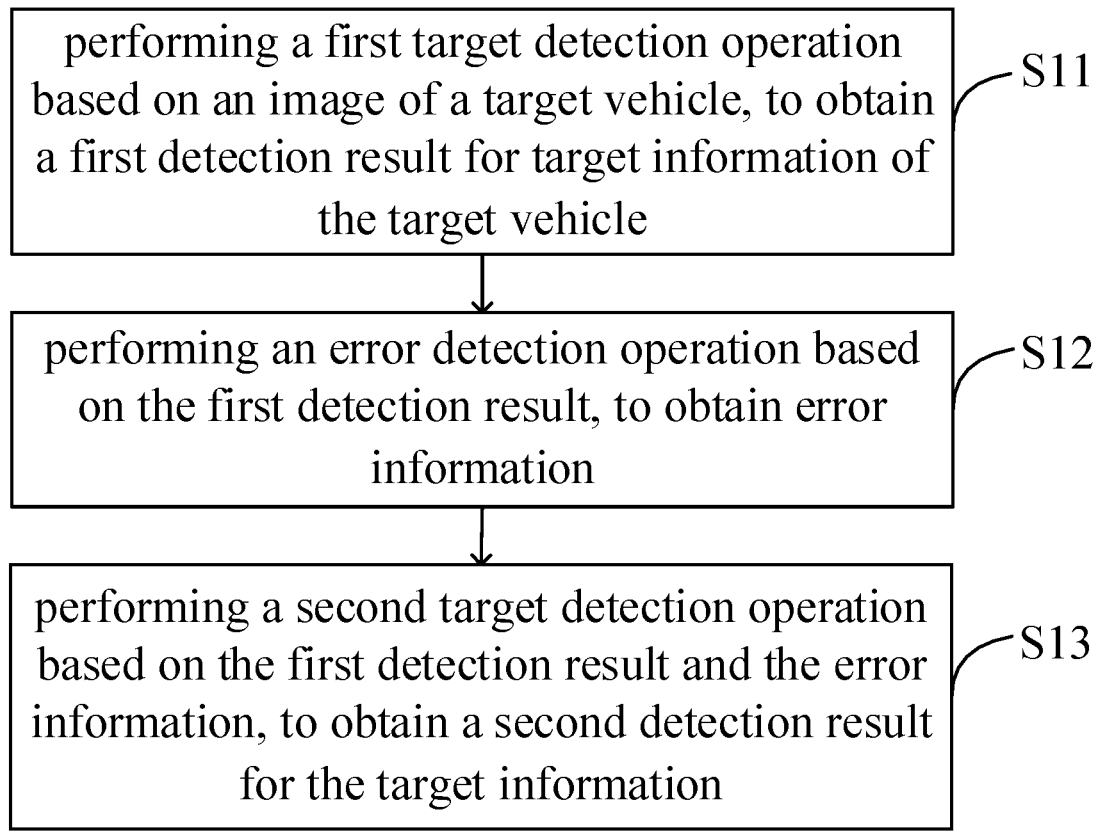
FIG. 1 is a schematic diagram of a vehicle information detection method according to an embodiment of the present disclosure.

FIG. 1 illustrates a vehicle information detection method according to an embodiment of the present disclosure. As shown in FIG. 1, the method may include:

S11, performing a first target detection operation based on an image of a target vehicle to obtain a first detection result for target information of the target vehicle;

S12, performing an error detection operation based on the first detection result, to obtain error information; and S13, performing a second target detection operation based on the first detection result and the error information, to obtain a second detection result for the target information.

According to the method provided by the embodiment of the disclosure, after the first target detection operation is performed on the image of the target vehicle to obtain the first detection result for the target information, error detection is performed on the detection result, and then the second target detection operation is performed based on the first detection result and the error information. Since the second detection result is obtained by referring to the error information of the first detection result, higher detection precision and robustness are achieved. Therefore, the method provided by the embodiment of the disclosure may improve the detection precision of the target information, thereby realizing the accurate detection of the vehicle information based on a monocular image. Since the radar point cloud data does not need to be relied on, the cost of accurately detecting the vehicle information is remarkably reduced.

In an exemplary embodiment, the first target detection operation in S11 described above may be performed based on a first target detection model. The first target detection model may adopt a network structure such as Densely Connected Networks (DenseNet), Residual Network (ResNet), Fully Convolutional Networks (FCN), and U-Net. The first detection result obtained based on the first target detection operation may include one or more of a feature map output by the first target detection model, a value of the target information, and a prediction map of the target information.

Figure 2A:
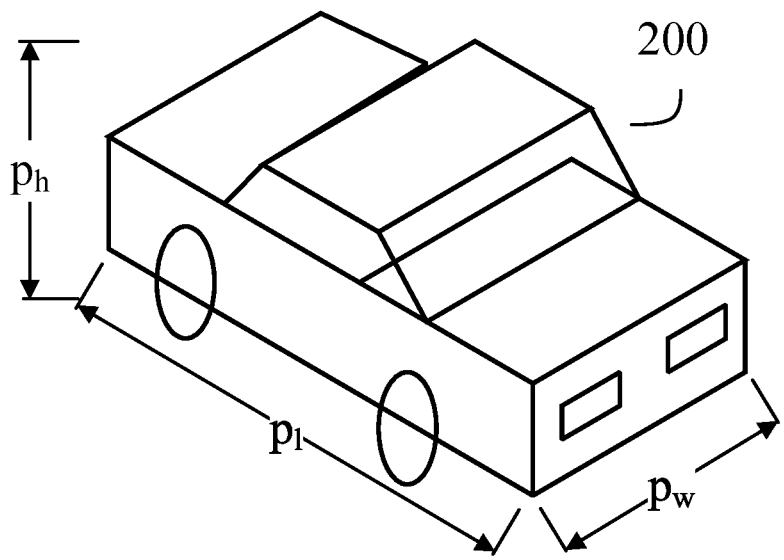
FIG. 2A is a first schematic diagram of target information according to an embodiment of the present disclosure.
Figure 2B:
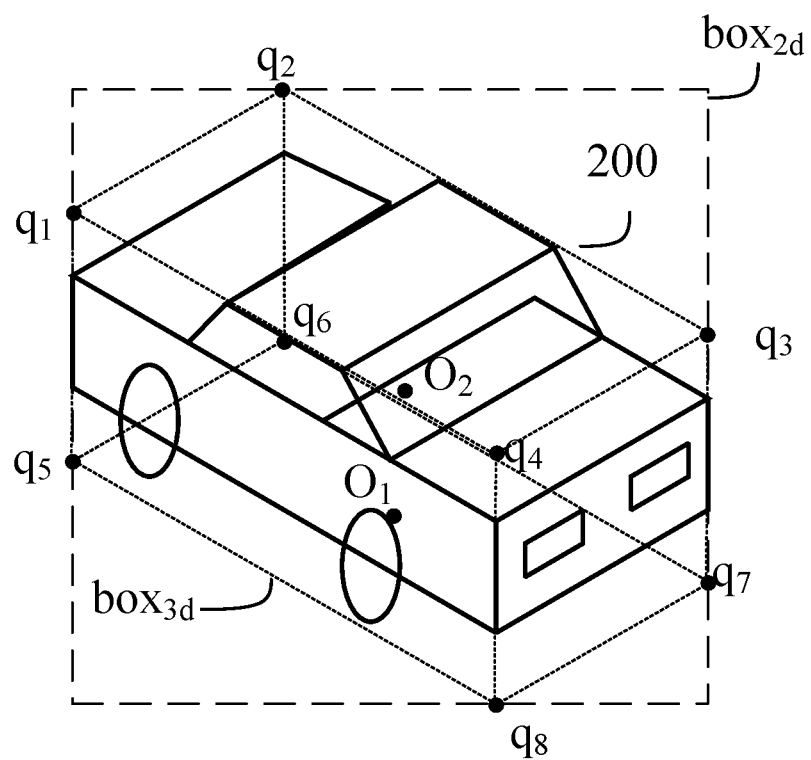
FIG. 2B is a second schematic diagram of target information according to an embodiment of the present disclosure.

As an example, the target information may include one or more of the following:

(1) an actual position of the target vehicle;
(2) an orientation angle of the target vehicle;
(3) a vehicle type of the target vehicle;
(4) size information of the target vehicle 200 as shown in FIG. 2A, such as length $p_l$, width $p_w$, and height $p_h$;
(5) a two-dimensional detection box $box_{2d}$ of the target vehicle in the image shown in FIG. 2B, wherein the two-dimensional detection box $box_{2d}$ may be the smallest circumscribed bounding box of projection points $q_1$ to $q_8$ of respective vertexes of the three-dimensional detection box $box_{3d}$ of the target vehicle in the image;
(6) an offset of a bottom surface center point of the target vehicle, wherein the offset may characterize a difference between a projection point $O_1$ of the bottom surface center point of the target vehicle in the image and a center point $O_2$ of the two-dimensional detection box $box_{2d}$ as shown in FIG. 2B.

In an exemplary embodiment, the error detection operation in S12 described above may be performed based on an error detection model. An example of an error detection model is provided below.

Figure 3:
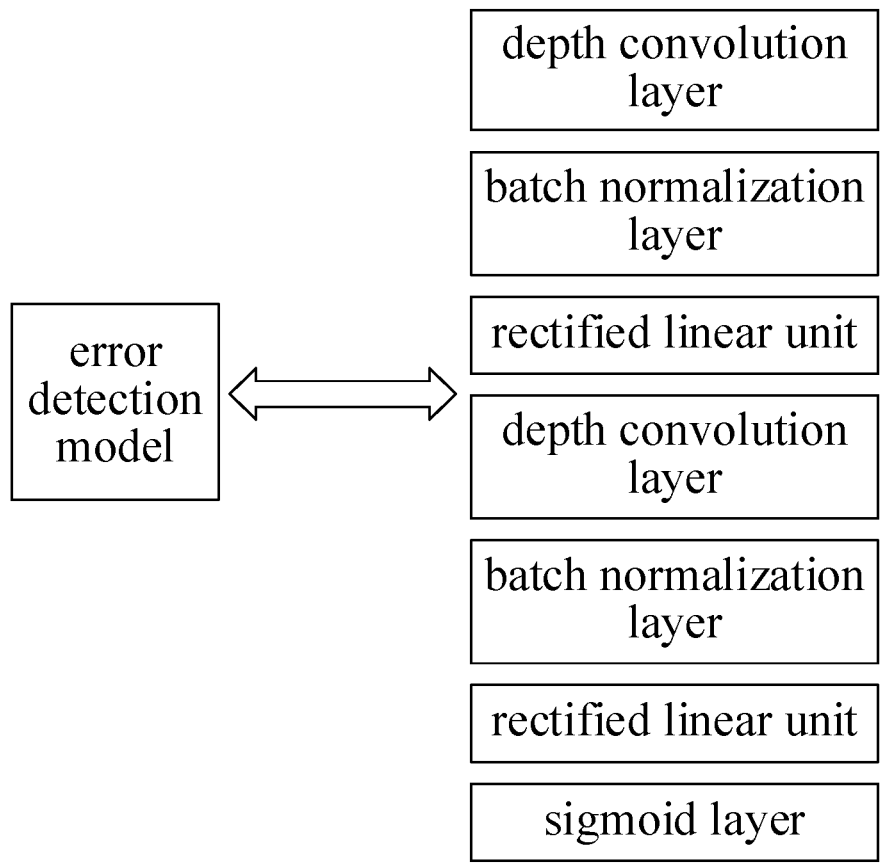
FIG. 3 is a schematic diagram of an error detection model according to an embodiment of the present disclosure.

The error detection model may employ a lightweight network structure, and an exemplary structure of the error detection model is shown in FIG. 3. As shown in FIG. 3, the error detection model mainly includes one or more depth convolution layers. In addition, the error detection model may include a Batch Normalization (BatchNorm) layer, a Rectified Linear Unit (ReLU) and a Sigmoid layer.

Alternatively, the first detection result may be input to the error detection model, to obtain error information output by the error detection model. For example, the value of the target information is input to the error detection model, to obtain an error value output by the error detection model as the error information.

Alternatively, channel connection is performed on the feature map in the first detection result and the prediction map of the target information to obtain an input feature map of the error detection model. For example, the first target detection model outputs a target feature map with 128 channels corresponding to the image of the target vehicle, and a prediction map with 2 channels of the offset. Then, channel connection may be performed on the target feature map and the prediction map of the offset to obtain an input feature map with 130 channels. Then the input feature map is input to an error detection model, to obtain an error prediction map $F_{err}$ output by the error detection model as error information. The larger the pixel value in the error prediction map $F_{err}$, the less reliable the corresponding first detection result.

Figure 4:
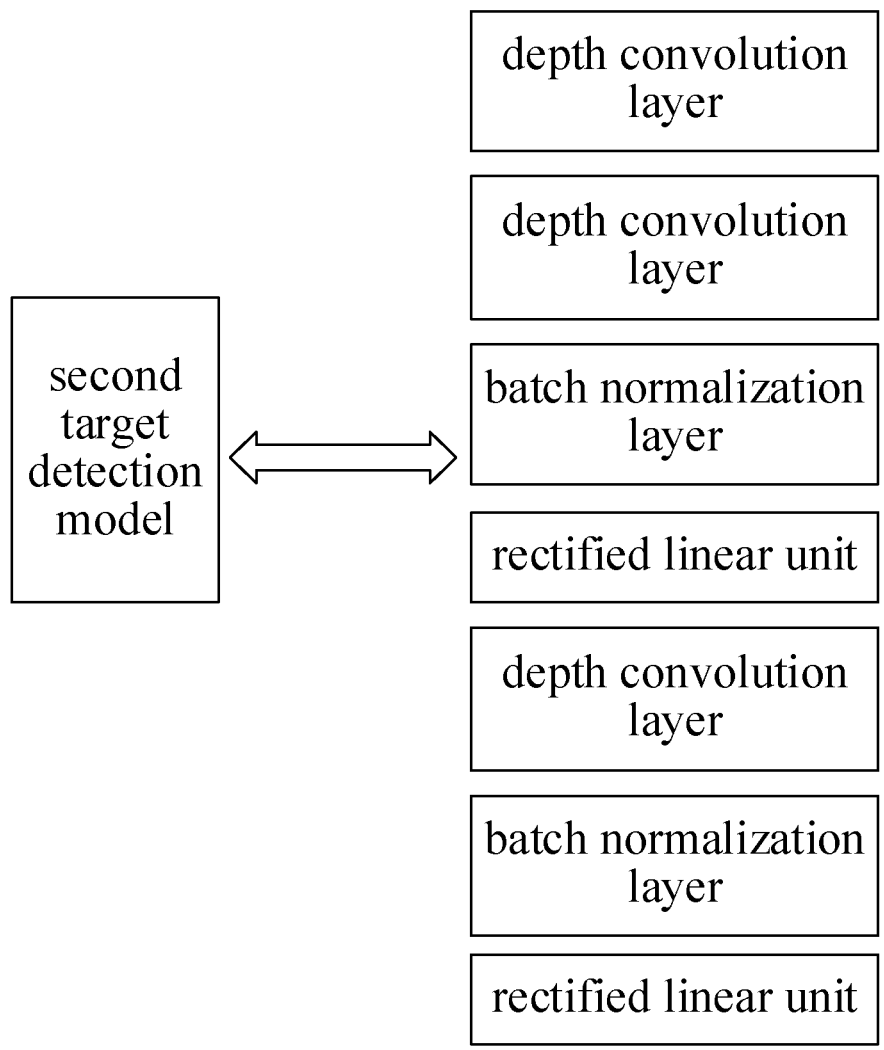
FIG. 4 is a schematic diagram of a second target detection model according to an embodiment of the present disclosure.

In an exemplary embodiment, the second target detection operation in S13 described above may be performed based on a second target detection model. The second target detection model may adopt a network structure such as DenseNet, ResNet, FCN, and U-Net, and also may adopt a lightweight network structure. FIG. 4 shows an exemplary structure of a second target detection model. As shown in FIG. 4, the second target detection model mainly includes one or more depth convolution layers. In addition, the second target detection model may further include a batch normalization layer and a rectified linear unit.

The first detection result obtained based on the first target detection operation may include one or more of a feature map output by the first target detection model, a value of the target information, a prediction map of the target information, and the like.

Alternatively, the first detection result and the error information may be respectively input into the second target detection model, which is used for realizing the second target detection operation on the image of the target vehicle, to obtain the second detection result output by the second target detection model. The second detection result may include one or more of a feature map output by the second target detection model, a value of the target information, and a prediction map of the target information.

Alternatively, the first detection result may include a target feature map corresponding to the image; and the error information may include an error prediction map. Correspondingly, performing a second target detection operation based on the first detection result and the error information to obtain a second detection result for the target information may include:

performing channel connection on the target feature map corresponding to the image and the error prediction map to obtain an input feature map; and performing the second target detection operation on the input feature map to obtain the second detection result for the target information.

For example, if the target feature map includes 128 channels, and the error prediction map includes 1 channel, the input feature map with 129 channels is obtained after channel concatenation. The input feature map is input into a second target detection model as shown in FIG. 4, to obtain one or more of the size information, the orientation angle and the offset of the bottom surface center point of the target vehicle output by the model.

In the alternative embodiment, the first detection result and the error information are fused by channel connection, so that all the information contained in the first detection result and the error information can be kept, and the accuracy of the second detection result obtained by the second target detection operation is improved.

Figure 5:
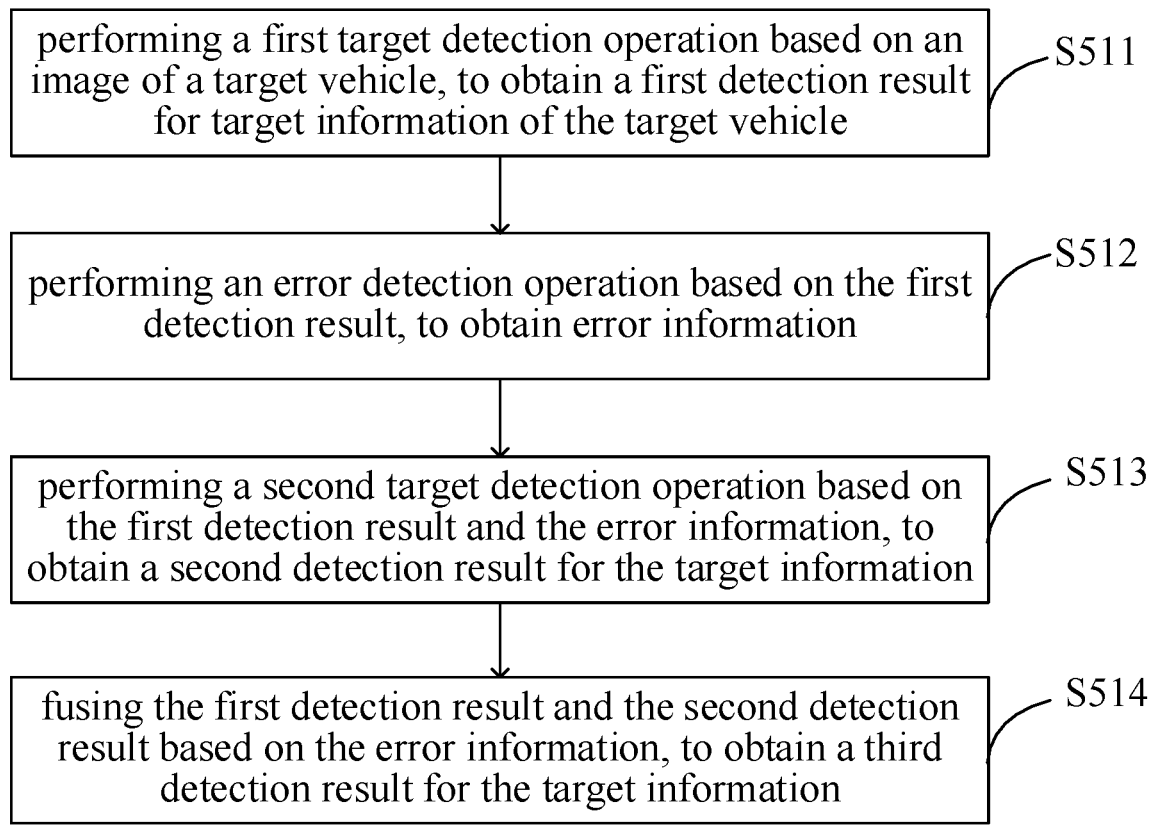
FIG. 5 is a schematic diagram of a vehicle information detection method according to another embodiment of the present disclosure.

S511, S512, and S513 shown in FIG. 5 are operations same as or similar to S11, S12 and S13 shown in FIG. 1, respectively. With further reference to FIG. 5, a schematic diagram of a vehicle information detection method according to another embodiment of the present disclosure is shown. As shown in FIG. 5, the vehicle information detection method may further include:

S514, fusing the first detection result and the second detection result based on the error information, to obtain a third detection result for the target information.

As an example, weights of the first detection result and the second detection result may be determined based on the error information, and then weighted addition is performed on the first detection result and the second detection result to obtain a third detection result.

According to the embodiment, because the third detection result is a fusion of the first detection result and the second detection result, compared with the first detection result and the second detection result, the error of the third detection result is smaller, and the detection precision and robustness of the target information are further improved.

In an exemplary embodiment, in S514, the fusing the first detection result and the second detection result based on the error information to obtain the third detection result for the target information may include:

obtaining a first weight negatively correlated with the error information and a second weight positively correlated with the error information based on the error information;

taking the first weight as a weight of the first detection result;

taking the second weight as a weight of the second detection result; and performing weighted addition on the first detection result and the second detection result based on the weight of the first detection result and the weight of the second detection result, to obtain the third detection result for the target information.

For example, if the error information is $F_{err}$, then the first weight may be $(1-kF_{err})$ and the second weight may be $kF_{err}$, wherein k may be a coefficient of 1, 0.9, or 0.8. That is, the third detection result may be calculated with reference to the following formula:

$$p_{uv} = (1 - kF_{err}) * p_{uv\_1} + kF_{err} * p_{uv\_2} \qquad \text{Formula (1)}$$

wherein $p_{uv}$ denotes the third detection result, $p_{uv\_1}$ denotes the first detection result, and $p_{uv\_2}$ denotes the second detection result.

It can be seen that in the above-mentioned embodiment, the first detection result and the second detection result are fused by using the error information. When the error information is larger, i.e. the credibility of the first detection result is lower, the weight of the second detection result is set to be greater. When the error information is smaller, i.e. the credibility of the first detection result is higher, the weight of the first detection result is set to be greater. Therefore, the third detection result refers to a detection result with the higher credibility to a larger extent, and the accuracy of the third detection result is further improved.

In practice, the target information may include the offset of the bottom surface center point of the target vehicle. The offset represents the difference between the projection point of the bottom surface center point of the target vehicle in the image and the center point of the two-dimensional detection box of the target vehicle in the image. For example, the offset may be a normalized result of the difference between the coordinates of the projection point $O_1(b_u, b_v)$ of the bottom surface center point in the image and the coordinates of the center point $O_2(x_{2d}, y_{2d})$ of the two-dimensional detection box.

The two-dimensional detection box may be represented as $\text{box}_{2d}[x_{2d}, y_{2d}, w_{2d}, h_{2d}]$ based on the center point $O_2(x_{2d}, y_{2d})$ of the two-dimensional detection box, the width $w_{ed}$ of the two-dimensional detection box and the height $h_{2d}$ of the two-dimensional detection box. Based on the two-dimensional detection box $\text{box}_{2d}[x_{2d}, y_{2d}, w_{2d}, h_{2d}]$ and the projection point $O_1[b_u, b_v]$ of the bottom surface center point in the image, the offset $t_{uv}$ of the bottom surface center point may be expressed as $$t_{uv} = [(b_u - x_{2d})/w_{2d}, (b_v - y_{2d})/h_{2d}]; \qquad \text{Formula (2)}$$

wherein $$x_{2d} = [(\min(p_i[u_i]) + \max(p_i[u_i]))/2; \qquad \text{Formula (3)}$$

$$y_{2d} = [(\min(p_i[v_i]) + \max(p_i[v_i]))/2; \qquad \text{Formula (4)}$$

$$w_{2d} = \max(p_i[u_i]) - \min(p_i[u_i]); \qquad \text{Formula (5)}$$

$$h_{2d} = \max(p_i[v_i]) - \min(p_i[v_i]); \qquad \text{Formula (6)}$$

wherein $\min(p_i[u_i])$ is the minimum value of u-axis coordinates of respective vertexes of the three-dimensional detection box $\text{box}_{3d}$ in the uv coordinate system of the image; $\max(p_i[u_i])$ is the maximum value of u-axis coordinates of respective vertexes of the three-dimensional detection box $\text{box}_{3d}$ in the uv coordinate system of the image; $\min(p_i[v_i])$ is the minimum value of v-axis coordinates of respective vertexes of the three-dimensional detection box $box_{3d}$ in the uv coordinate system of the image; $\max(p_i [v_i])$ is the maximum value of v-axis coordinates of respective vertexes of the three-dimensional detection box $box_{3d}$ in the uv coordinate system of the image.

Figure 6:
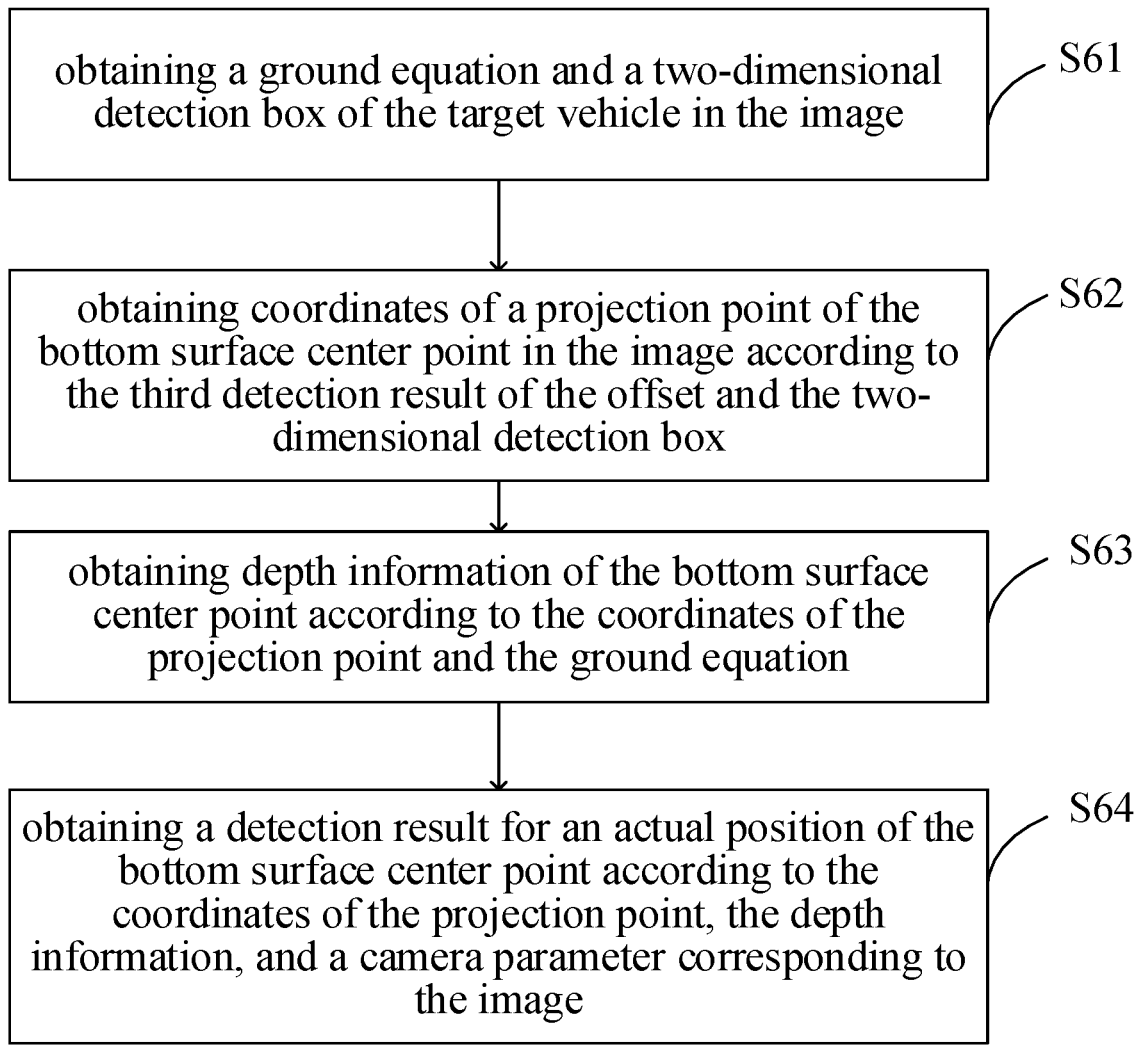
FIG. 6 is a schematic diagram of a vehicle information detection method according to yet another embodiment of the present disclosure.

Based on the vehicle information detection method provided by the embodiment of the disclosure, the prediction result of the offset can be obtained. On this basis, as shown in FIG. 6, the vehicle information detection method may further include S61-S64.

In S61, a ground equation and a two-dimensional detection box of the target vehicle in the image are obtained.

The ground equation may be pre-configured. For example, an image acquisition device for acquiring an image of a vehicle is provided under a certain road or driving scene. Ground information within the field of view of the image acquisition device may be measured in advance to obtain the ground equation.

A two-dimensional detection box may be obtained by a first target detection operation. That is, based on the image of the target vehicle, the first target detection operation is performed, also to obtain a detection result of the two-dimensional detection box of the target vehicle in the image. The two-dimensional detection box may also be obtained in other ways, for example, by detecting the offset and the two-dimensional detection box respectively based on different target detection models.

In S62, coordinates of a projection point of the bottom surface center point in the image are obtained according to the third detection result of the offset and the two-dimensional detection box.

For example, the obtained two-dimensional detection box is $box_{2d}=[p_x, p_y, p_w, p_h]$ and the third detection result is an offset $t_{uv}=p_{uv}$, and the coordinates $b_u$ and $b_v$ of the projection point $p_{bottom}[u, v]$ of the bottom surface center point in the image may be calculated according to the above formula (2), Specifically refer to the following formula:

$$b_u = p_w * p_{uv}[0] + p_x; \qquad \text{Formula (7)}$$

$$b_v = p_h * p_{uv}[1] + p_y. \qquad \text{Formula (8)}$$

In S63, depth information of the bottom surface center point is obtained according to the coordinates of the projection point and the ground equation.

For example, the ground equation is: $ax+by+cz+d=0$; the projection point of the bottom surface center point in the image, obtained according to the S62 is $P_{bottom}[u, v]$, and homogeneous coordinates thereof are $bottom_{uv}=[b_u, b_v, 1]$; then, coordinates of the bottom surface center point in the camera coordinate system are $$bottom_c = K^{-1}*[b_u, b_v, 1]^T; \qquad \text{Formula (9)}$$

wherein K is a camera internal parameter matrix $$\begin{bmatrix} f_x & 0 & c_x \\ 0 & f_y & c_y \\ 0 & 0 & 1 \end{bmatrix}$$

of an image acquisition device, and the image acquisition device is configured for acquiring an image of a target vehicle; $K^{-1}$ represents an inverse matrix of the inner parameter matrix. $(.)^T$ represents the transpose of the matrix.

By combining the coordinates of the bottom surface center point in the camera coordinate system and the ground equation, the depth $Z_{p_{bottom}}$ of the bottom surface center point may be calculated as follows:

$$Z_{p_{bottom}} = -(a*bottom_c[0] + b*bottom_c[1] + c*bottom_c[2]) * \frac{d}{bottom_c} \qquad \text{Formula (10)}$$

In S64, a detection result for an actual position of the bottom surface center point is obtained according to the coordinates of the projection point, the depth information and a camera parameter corresponding to the image.

As an example, the relation between the coordinates $p_{bottom}[u, v]=[b_u, b_v]$ of the projection point of the bottom surface center point in the image and the coordinates $$P_{p\_bottom} = \begin{bmatrix} X_{p_{bottom}} \\ Y_{p_{bottom}} \\ Z_{p_{bottom}} \end{bmatrix}$$

of the bottom surface center point in the camera coordinate system is as follows:

$$Z_{p_{bottom}} \begin{bmatrix} b_u \\ b_v \\ 1 \end{bmatrix} = K \begin{bmatrix} X_{p_{bottom}} \\ Y_{p_{bottom}} \\ Z_{p_{bottom}} \end{bmatrix} \qquad \text{Formula (11)}$$

and then $$\begin{bmatrix} X_{p_{bottom}} \\ Y_{p_{bottom}} \\ Z_{p_{bottom}} \end{bmatrix} = K^{-1} Z_{p_{bottom}} \begin{bmatrix} b_u \\ b_v \\ 1 \end{bmatrix} \qquad \text{Formula (12)}$$

According to the transformation principle from the camera coordinate system to the ground coordinate system, the coordinates of the bottom surface center point in the ground coordinate system may be obtained, i.e. the actual position of the bottom surface center point is $P_{g\_bottom}$:

$$P_{g\_bottom} = R_{c2g} * P_{p_{bottom}} \qquad \text{Formula (13)}$$

wherein $R_{c2g}$ is a rotation matrix from the camera coordinate system to the ground coordinate system.

An example of how to obtain the rotation matrix $R_{c2g}$ is as follows.

The transformation matrix from the camera coordinate system to the ground coordinate system is $$T_{c2g} = \begin{bmatrix} R_{c2g} & t_{c2g} \\ 0 & 1 \end{bmatrix},$$

which may be simplified to $t_{c2g}$ as 0 considering only the change of two coordinate systems. The solution of $R_{c2g}$ may be calculated according to the rotation vector and the Rodrigues formula. Under the condition that the ground equation is $ax+by+cz+d=0$, a vector $\vec{a}=[0,0,1]$ in the camera coordinate system is changed into a normal vector $\vec{b}=[a, b, c]$ of the ground through rotation, and the rotation angle may be obtained as follows:

$$\cos\theta = \frac{\vec{a}\cdot\vec{b}}{\|\vec{a}\|\|\vec{b}\|} = \frac{c}{\sqrt{a^2+b^2+c^2}} \qquad \text{Formula (14)}$$

For the rotation axis $\vec{n} = \vec{a}\times\vec{b} = [n_1, n_2, n_3]$, $\vec{n}^{\wedge}$ is denoted as a conversion operator from a vector to the antisymmetric, and then:

$$\vec{n}^{\wedge} = \begin{bmatrix} 0 & -n_3 & n_2 \\ n_3 & 0 & -n_1 \\ -n_2 & n_1 & 0 \end{bmatrix} \qquad \text{Formula 15}$$

The rotation matrix may be obtained from the Rodrigues formula as follows:

$$R_{c2g} = \cos\theta \vec{I} + (1-\cos\theta)\vec{n}\cdot\vec{n}^T + \sin\theta \vec{n}^{\wedge}. \qquad \text{Formula (16)}$$

According to the above embodiment, the first detection result and the second detection result are obtained in stages, then the first detection result and the second detection result are fused to obtain the offset of the bottom surface center point of the target vehicle, and then the actual position of the bottom surface center point is obtained by combining the ground equation and the two-dimensional detection box of the target vehicle in the image.

As a monocular image is affected by the perspective projection of the camera, i.e., everything looks small in the distance and big on the contrary, the detection error of the bottom surface center point is large, thus the detection error mainly comes from the bottom surface center point in the monocular image-based vehicle detection solution for road driving and monitoring scenes. Therefore, according to the embodiment of the disclosure, the accurate third detection result is obtained by adopting a multi-stage detection mode for the offset of the bottom surface center point, then the actual position of the bottom surface center point is determined based on the accurate offset, thus the detection error of the vehicle information based on the monocular image can be effectively and greatly reduced. In addition, the two-dimensional detection box in the image and the detection results of other information such as the length, the width, the height, the orientation angle, the vehicle type, the confidence degree of the vehicle can be obtained in a relatively fast mode, so that the calculation complexity is simplified, a good balance is obtained between the detection precision and the calculation complexity, thereby improving the detection precision to the maximum extent, and reducing the hardware calculation cost.

As an example, the vehicle information detection method may further include:
  obtaining height information of the target vehicle; and
  obtaining a detection result for the actual position of the target vehicle according to the detection result for the actual position of the bottom surface center point and the height information of the target vehicle.

The height information can be obtained by the first target detection operation. That is, the first target detection operation is performed based on the image of the target vehicle, also to obtain a detection result of the height information of the target vehicle. The height information may also be obtained in other ways, such as detecting the offset and the height information respectively based on different target detection models.

As an example, the actual position $P_{g\_bottom}$ of the bottom surface center point is determined based on the formula (13), and the height information H of the target vehicle is determined based on the first target detection operation. Since the actual position of the bottom surface center point and the actual position of the center point of the three-dimensional detection box of the target vehicle only differ by H/2 in the z-axis of the ground coordinate system, the actual position $P_{g\_center}$ of the center point of the three-dimensional detection box of the target vehicle, i.e., the actual position of the target vehicle, may be determined according to the following formula:

$$P_{g\_center} = P_{g\_bottom} + \begin{bmatrix} 0 \\ 0 \\ H/2 \end{bmatrix} \qquad \text{Formula (17)}$$

According to the embodiment, the detection result of the actual position of the target vehicle can be obtained according to the actual position of the bottom surface center point, and more comprehensive three-dimensional information can be obtained for the target vehicle.

Figure 7:
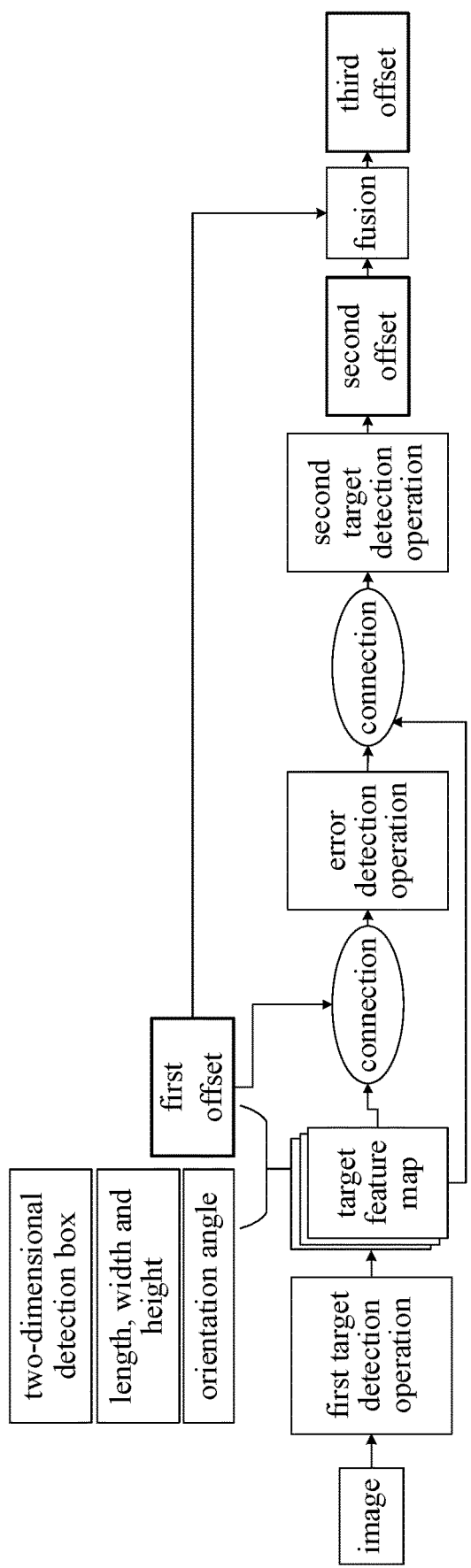
FIG. 7 is a schematic diagram of an application example.

FIG. 7 shows an application example of a vehicle information detection method. According to this application example, first, a first target detection operation is performed on an image of a target vehicle to obtain a target feature map. The target feature map may include information such as a two-dimensional detection box, a length, the width, a height, and an orientation angle of the target vehicle, and also may include a first offset. Here, the first offset refers to a first detection result of an offset of a bottom surface center point of the target vehicle. The target feature map may also include information (not shown) such as a vehicle type of the target vehicle and a confidence level of the first target detection operation.

After the first offset is obtained, a prediction map of the first offset is connected with the target feature map, and an error detection operation is performed on the connected information. Output information of the error detection operation is connected with the target feature map, and a second target detection operation is performed on the connected information to obtain a second offset, namely a second detection result of the offset.

Fusion is performed based on the first offset and the second offset to obtain a third offset, i.e. a third detection result of the offset. The third detection result may serve as a final detection result of the offset. Based on the finally detected offset, the actual position of the center point of the target vehicle can be calculated. In this way, through the processing architecture shown in FIG. 7, comprehensive three-dimensional information of the target vehicle, including the length, the width, the height, the orientation angle and the actual position of the center point, can be obtained, and high detection accuracy and robustness can be achieved.

Figure 8:
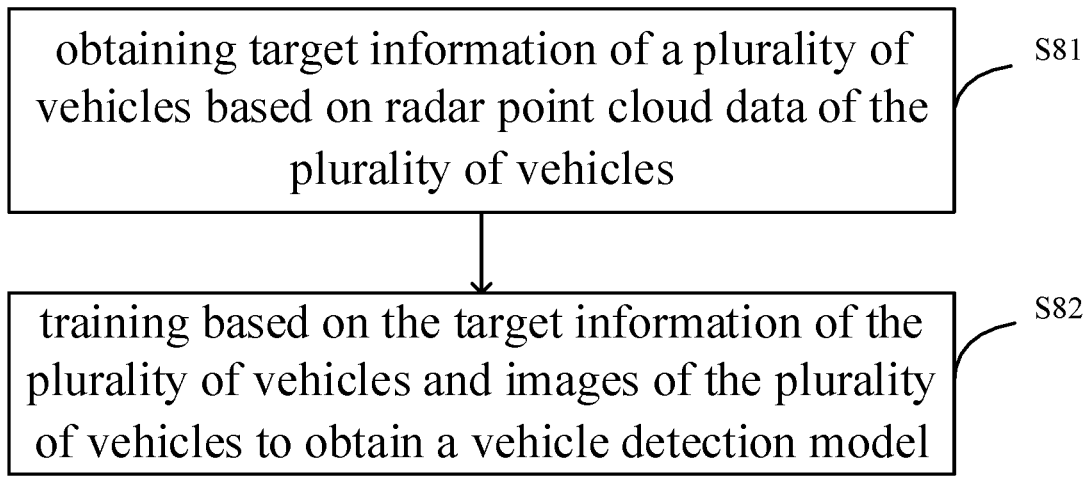
FIG. 8 is a schematic diagram of a method for training a vehicle information detection model according to an embodiment of the present disclosure.

FIG. 8 illustrates a method for training a vehicle information detection model according to an embodiment of the present disclosure. As shown in FIG. 8, the method may include:
  S81, obtaining target information of a plurality of vehicles based on radar point cloud data of the plurality of vehicles; and
  S82, training based on the target information of the plurality of vehicles and images of the plurality of vehicles to obtain a vehicle detection model, wherein the vehicle detection model is used for obtaining a detection result for target information of a target vehicle based on an image of the target vehicle.

As an example, the vehicle detection model may be used to perform steps of the above-described vehicle information detection method on an image of a target vehicle.

For example, the vehicle detection model may include a first target detection model, an error detection model, and a second target detection model. The first target detection model is used for performing a first target detection operation based on an image of the target vehicle, to obtain a first detection result for target information of the target vehicle; the error detection model is used for performing an error detection operation based on the first detection result, to obtain error information; and the second target detection model is used for performing a second target detection operation based on the first detection result and the error information, to obtain a second detection result for the target information.

In the embodiment of the disclosure, a laser radar or a millimeter wave radar may be adopted to obtain radar point cloud data of a plurality of vehicles. In the practical application, in S81, the obtaining target information of the plurality of vehicles based on the radar point cloud data of the plurality of vehicles may include:

obtaining three-dimensional detection boxes of the plurality of vehicles in a radar coordinate system based on the radar point cloud data of the plurality of vehicles;

calculating coordinates of projection points of respective vertexes and bottom surface center points of the three-dimensional detection boxes of the plurality of vehicles in the images according to the three-dimensional detection boxes of the plurality of vehicles in the radar coordinate system, a pre-configured radar parameter and a camera parameter;

obtaining two-dimensional detection boxes of the plurality of vehicles according to the coordinates of the projection points of the respective vertexes of the three-dimensional detection boxes of the plurality of vehicles in the images; and obtaining offsets of the bottom surface center points of the plurality of vehicles according to the coordinates of the projection points of the bottom surface center points of the three-dimensional detection boxes of the plurality of vehicles in the images and the two-dimensional detection boxes of the plurality of vehicles.

As an example, a transformation relation between the radar coordinate system and a camera coordinate system may be obtained according to the pre-configured radar parameter and the camera parameter, and then three-dimensional detection boxes of the plurality of vehicles in the radar coordinate system may be converted into three-dimensional detection boxes of the plurality of vehicles in the camera coordinate system according to the transformation relation between the radar coordinate system and the camera coordinate system. Then, the coordinates of the projection points of the respective vertexes of the three-dimensional detection boxes of the plurality of vehicles in the images may be calculated according to the camera parameter corresponding to the camera coordinate system.

As an example, the two-dimensional detection boxes of the plurality of vehicles may be obtained according to the above formulas (3)-(6). The offsets of the bottom surface center points may be obtained based on the above formula (2).

According to the above embodiment, the accurate offset of the bottom surface center point can be obtained, and the calculation process is simple, thus the calculation efficiency is high.

In the practical application, target information such as the length, the width, the height and the orientation angle of each of the plurality of vehicles may also be obtained according to the three-dimensional detection boxes of the plurality of vehicles in the radar coordinate system, the pre-configured radar parameter, the camera parameter and the ground equation.

As an example, in S82, the training based on the target information of the plurality of vehicles and the images of the plurality of vehicles to obtain the vehicle detection model, may include:

calculating a loss function of the first target detection model and a loss function of the second target detection model based on the target information of the plurality of vehicles and the images of the plurality of vehicles, wherein the first target detection model is used for performing a first target detection operation based on an image of a target vehicle to obtain a first detection result for target information of the target vehicle, and the second target detection model is used for performing a second target detection operation based on the first detection result and error information of the first detection result to obtain a second detection result for the target information;

in the case where a sum of the loss function of the first target detection model and the loss function of the second target detection model is greater than a preset threshold value, adjusting a parameter of the first target detection model and a parameter of the second target detection model according to the loss function of the first target detection model and the loss function of the second target detection model, and returning to the calculating the loss function of the first target detection model and the loss function of the second target detection model until the sum of the loss function of the first target detection model and the loss function of the second target detection model is less than or equal to the preset threshold value, to obtain a converged first target detection model and a converged second target detection model; and obtaining the vehicle detection model based on the converged first target detection model and the converged second target detection model.

As an example, for the error detection model in the vehicle detection model, the calculation of the loss function may not be performed.

In the embodiment of the present disclosure, the loss function of the first target detection model may be calculated using a smooth L1 regression loss and/or a cross entropy loss. In the case where the first detection result includes detection results of a variety of target information, the loss function of the first target detection model is the sum of loss functions of the variety of target information.

For example, the smooth L1 regression loss is used to solve a loss function $L_{hwl}$ of a length, width and height, a loss function $L_{angle}$ of an orientation angle, a loss function $L_{uv1}$ of an offset of a bottom surface center point, and a loss function $L_{box2d}$ of a two-dimensional detection box in the first target detection model. A loss function $L_{class}$ of a vehicle type is obtained by the cross entropy loss. Then the loss function of the first target detection model is as follows:

$$L_{stage1} = L_{angle} + L_{hwl} + L_{class} + L_{box2d} + L_{uv1} \qquad \text{Formula (18)}$$

Take $L_{uv1}$ as an example, it is calculated as follows:

$$L_{uv1} = \text{smooth}_{L1}(p_{uv1}, t_{uv}) \quad \text{Formula (19)}$$

$p_{uv}$ is the offset of the bottom surface center point output by the first target detection model, and $t_{uv}$ is the offset of the bottom surface center point calculated according to the radar point cloud data. $\text{smooth}_{L1}$ is calculated as follows:

$$\text{smooth}_{L1}(y, p) = \begin{cases} 0.5(y-p)^2 & \text{if } |y-p| < 1 \\ |y-p| - 0.5 & \text{otherwise} \end{cases} \quad \text{Formula (20)}$$

wherein y and p represent two input information of a function $\text{smooth}_{L1}$, such as a detection result for the target information and a calculation result based on the radar point cloud data.

For another example, in the case where a third detection result output by the second target detection model includes a detection result of the offset of the bottom surface center point, a loss function of the second target detection model is:

$$L_{stage3} = L_{uv3} \quad \text{Formula (21)}$$

Here, $L_{p\_uv}$ is calculated as follows:

$$L_{uv3} = \text{smooth}_{L1}(p_{uv3}, t_{uv})$$

$p_{uv3}$ is the offset of the bottom surface center point output by the second target detection model, and $t_{uv}$ is the offset of the bottom surface center point calculated according to the radar point cloud data.

A loss function L of the vehicle detection model is a sum of the loss function $L_{stage1}$ of the first target detection model and the loss function $L_{stage3}$ of the second target detection model:

$$L = L_{stage1} + L_{stage3} \quad \text{Formula (22)}$$

The vehicle detection model obtained by training on the basis of the above method may be used for performing steps of the vehicle information detection method on the image of the target vehicle. Therefore, the technical details in the method for training the vehicle detection model provided by the embodiment of the disclosure may be realized by referring to the technical features in the vehicle information detection method.

Figure 9:
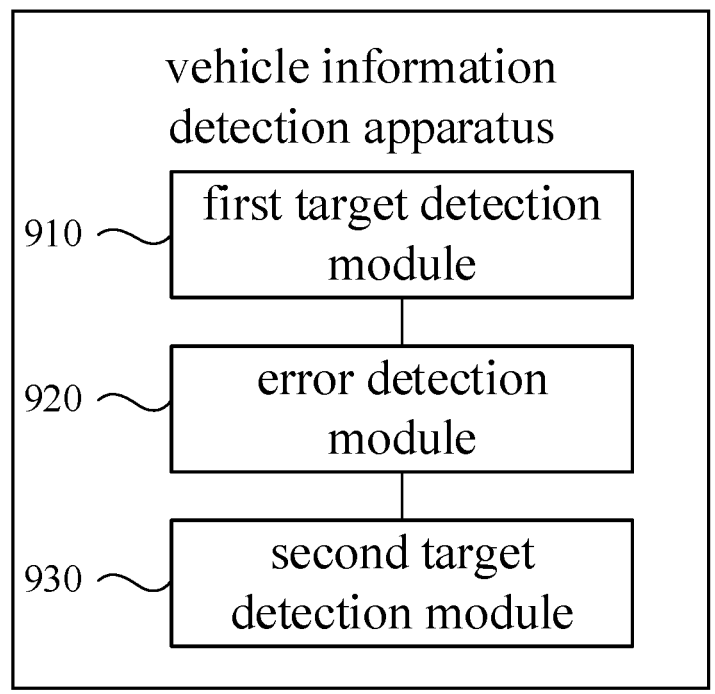
FIG. 9 is a schematic diagram of a vehicle information detection apparatus according to an embodiment of the present disclosure.

As an implementation of the above method, FIG. 9 shows a schematic diagram of a vehicle information detection apparatus according to an embodiment of the present disclosure. As shown in FIG. 9, the apparatus may include:
- a first target detection module 910 configured for performing a first target detection operation based on an image of a target vehicle, to obtain a first detection result for target information of the target vehicle;
- an error detection module 920 configured for performing an error detection operation based on the first detection result, to obtain error information; and
- a second target detection module 930 configured for performing a second target detection operation based on the first detection result and the error information, to obtain a second detection result for the target information.

Figure 10:
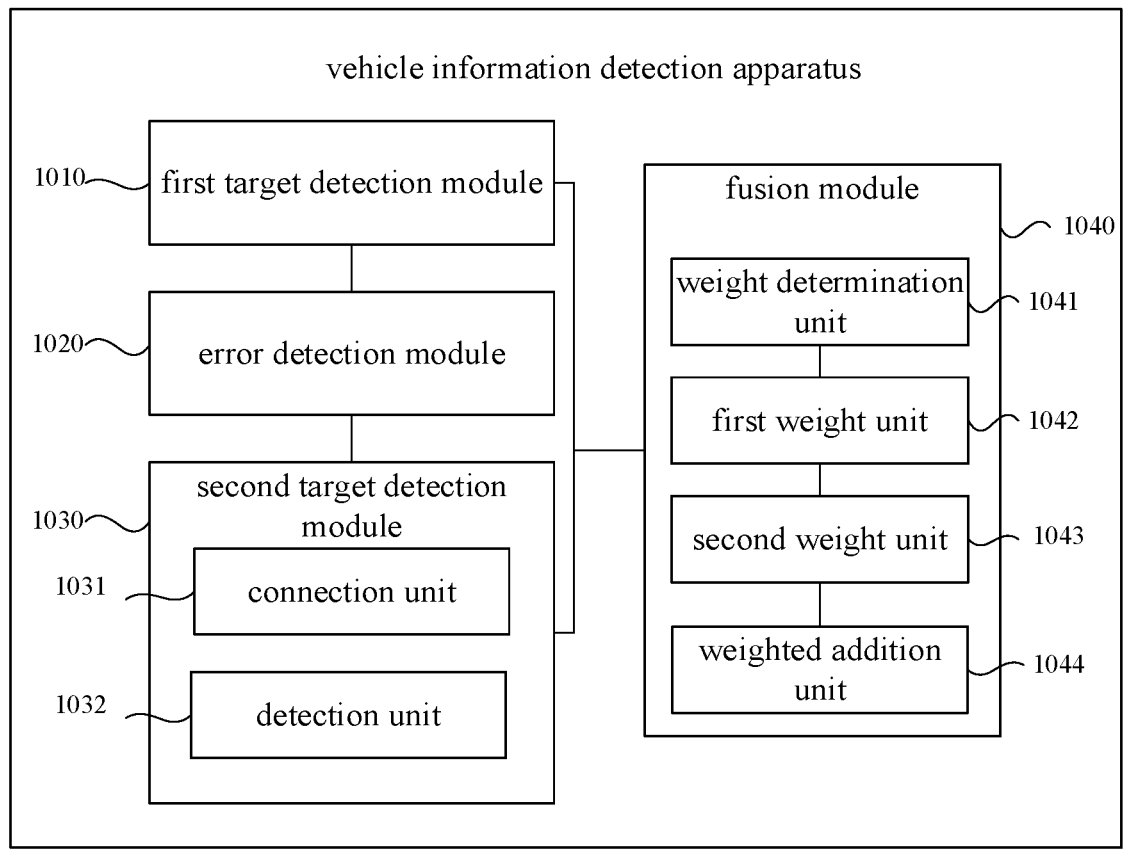
FIG. 10 is a schematic diagram of a vehicle information detection apparatus according to another embodiment of the present disclosure.

A first target detection module 1010, an error detection module 1020 and a second target detection module 1030 shown in FIG. 10 are modules same as or similar to the first target detection module 910, the error detection module 920 and the second target detection module 930 shown in FIG. 9, respectively. Illustratively, as shown in FIG. 10, the apparatus may further include:
- a fusion module 1040 configured for fusing the first detection result and the second detection result based on the error information, to obtain a third detection result for the target information.

Illustratively, as shown in FIG. 10, in the apparatus, the fusion module 1040 may include:
- a weight determination unit 1041 configured for obtaining a first weight negatively correlated with the error information and a second weight positively correlated with the error information based on the error information;
- a first weight unit 1042 configured for taking the first weight as a weight of the first detection result;
- a second weight unit 1043 configured for taking the second weight as a weight of the second detection result; and
- a weighted addition unit 1044 configured for performing weighted addition on the first detection result and the second detection result based on the weight of the first detection result and the weight of the second detection result, to obtain the third detection result for the target information.

As an example, the first detection result may include a target feature map corresponding to the image, and the error information may include an error prediction map.

The second target detection module 1030 may include:
- a connection unit 1031 configured for performing channel connection on the target feature map corresponding to the image and the error prediction map to obtain an input feature map; and;
- a detection unit 1032 configured for performing the second target detection operation on the input feature map to obtain the second detection result for the target information.

As an example, the target information may include an offset of a bottom surface center point of the target vehicle. The apparatus may further include:
- a first acquisition module configured for obtaining a ground equation and a two-dimensional detection box of the target vehicle in the image;
- a projection module configured for obtaining coordinates of a projection point of the bottom surface center point in the image according to the third detection result of the offset and the two-dimensional detection box;
- a depth information module configured for obtaining depth information of the bottom surface center point according to the coordinates of the projection point and the ground equation; and
- a first calculation module configured for obtaining a detection result for an actual position of the bottom surface center point according to the coordinates of the projection point, the depth information, and a camera parameter corresponding to the image.

As an example, the apparatus may further include:
- a second acquisition module configured for obtaining height information of the target vehicle; and
- a second calculation module configured for obtaining a detection result for an actual position of the target vehicle according to the detection result for the actual position of the bottom surface center point and the height information of the target vehicle.

Figure 11:
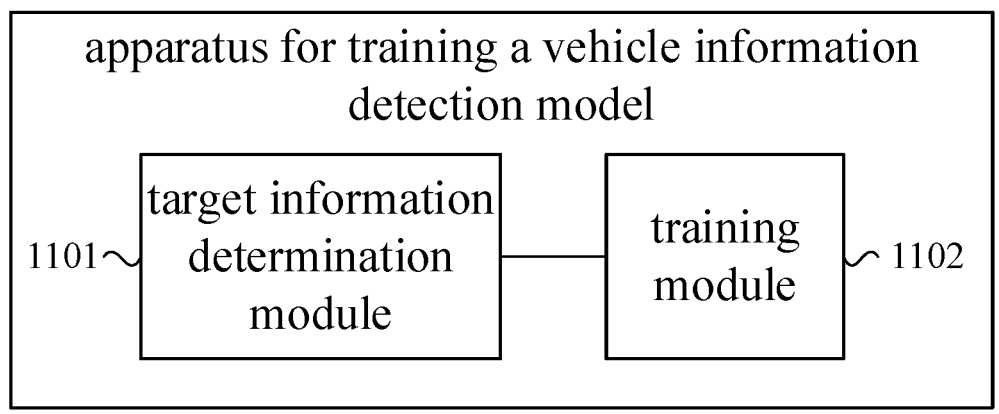
FIG. 11 is a schematic diagram of an apparatus for training a vehicle information detection model according to an embodiment of the present disclosure.

FIG. 11 is a schematic diagram of an apparatus for training a vehicle information detection model according to an embodiment of the present disclosure, and as shown in FIG. 11, the apparatus may include:
- a target information determination module 1101 configured for obtaining target information of a plurality of vehicles based on radar point cloud data of the plurality of vehicles; and
- a training module 1102 configured for training based on the target information of the plurality of vehicles and images of the plurality of vehicles to obtain a vehicle detection model, wherein the vehicle detection model is used for obtaining a detection result for target information of a target vehicle based on an image of the target vehicle.

As an example, the target information determination module 1101 may include:
- a three-dimensional data acquisition unit configured for obtaining three-dimensional detection boxes of the plurality of vehicles in a radar coordinate system based on the radar point cloud data of the plurality of vehicles;
- a projection point calculation unit configured for calculating coordinates of projection points of respective vertexes and bottom surface center points of the three-dimensional detection boxes of the plurality of vehicles in the images according to the three-dimensional detection boxes of the plurality of vehicles in the radar coordinate system, a pre-configured radar parameter and a camera parameter;
- a two-dimensional data determination unit configured for obtaining two-dimensional detection boxes of the plurality of vehicles according to the coordinates of the projection points of the respective vertexes of the three-dimensional detection boxes of the plurality of vehicles in the images; and
- an offset determination unit configured for obtaining offsets of the bottom surface center points of the plurality of vehicles according to the coordinates of the projection points of the bottom surface center points of the three-dimensional detection boxes of the plurality of vehicles in the images and the two-dimensional detection boxes of the plurality of vehicles.

According to an embodiment of the present disclosure, the present disclosure also provides an electronic device and a readable storage medium.

Figure 12:
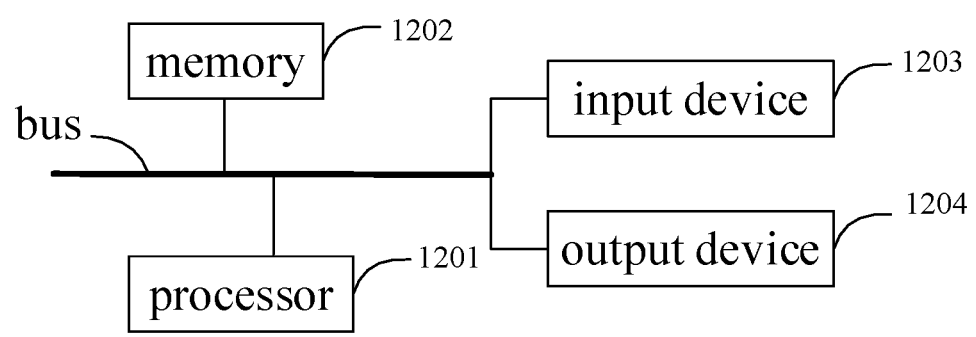
FIG. 12 is a block diagram of an electronic device for implementing the method of an embodiment of the disclosure.

FIG. 12 is a block diagram of an electronic device for implementing the method according to an embodiment of the disclosure. The electronic device is intended to represent various forms of digital computers, such as a laptop computer, desktop computer, workstation, personal digital assistant, server, blade server, mainframe computer, and other suitable computers. The electronic device may also represent various forms of mobile devices, such as personal digital processing, cellular telephone, smart phone, wearable equipment, and other similar computing devices. The parts, connections, and relations thereof, and functions thereof shown herein are by way of example only and are not intended to limit the implementations of the disclosure described and/or claimed herein.

As shown in FIG. 12, the electronic device includes: one or more processors 1201, a memory 1202, and interfaces for connecting various components, including a high-speed interface and a low-speed interface. The various components are interconnected using different buses and may be installed on a common motherboard or otherwise as desired. The processor may process instructions for execution within electronic device, including instructions stored in the memory or on the memory to display graphical information of the GUI on an external input/output device, (such as display equipment coupled to the interface). In other implementation modes, multiple processors and/or multiple buses may be used with multiple memories and multiple memories, if desired. Also, multiple electronic device may be connected, each providing some of the necessary operations (e.g., as an array of a server, one set of blade servers, or a multiprocessor system). An example of one processor 1201 is shown in FIG. 12.

The memory 1202 is a non-transitory computer-readable storage medium provided herein. Wherein, the memory stores an instruction executable by at least one processor to cause the at least one processor to execute the method provided herein. The non-transitory computer-readable storage medium of the disclosure stores computer instructions for causing a computer to execute the method provided herein.

The memory 1202, as one non-transitory computer-readable storage medium, may be used to store non-transitory software programs, non-transitory computer-executable programs, and modules, such as program instructions/modules (e.g., a first target detection module 910, an error detection module 920, a second target detection module 930, as shown in FIG. 9) corresponding to the method in the embodiment of the disclosure. The processor 1201 executes various functional disclosures and data processing of the server, i.e., implementing the method in the above-described method embodiment, by running non-transient software programs, instructions, and modules stored in the memory 1202.

The memory 1202 may include a program storage area and a data storage area. The program storage area may store an operating system and an application program required for at least one function. The data storage area may store data or the like created according to the usage of the electronic device of the method. In addition, the memory 1202 may include high speed random access memory, and may also include non-transitory memory, such as at least one disk storage component, flash memory component, or other non-transitory solid state storage components. In some embodiments, the memory 1202 optionally includes a memory remotely provided relative to the processor 1201. The remote memory may be connected to the electronic device of the method via a network. Instances of such networks include, but are not limited to, the Internet, intranets, local area networks, mobile communication networks, and combinations thereof.

The electronic device of the method may further include: an input device 1203 and an output device 1204. The processor 1201, the memory 1202, the input device 1203, and the output device 1204 may be connected by a bus or other means, exemplified by a bus connection in FIG. 12.

The input device 1203 may receive input digital or character information, and generate a key signal input related to the user setting and functional control of the electronic device of the method. For example, the input device may be a touch screen, a keypad, a mouse, a track pad, a touch pad, a pointer stick, one or more mouse buttons, a track ball, a joystick, and other input devices. The output device 1204 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementation modes of the system and technology described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as program, software, software disclosure, or code) include a machine instruction of a programmable processor, and may be applied using high-level procedure and/or object-oriented programming language, and/or assembly/machine language. As used herein, the terms "machine-readable medium" and "computer-readable medium" refer to any computer program product, equipment, and/or device (e.g., magnetic disk, optical disk, memory, programmable logic device (PLD)) for providing machine instructions and/or data to the programmable processor, including a machine-readable medium that receives a machine instruction as a machine-readable signal. The term "machine-readable signal" refers to any signal used to provide machine instructions and/or data to a programmable processor.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The system and technology described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

A computer system may include a client and a server. The client and server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS). The server may also be a server of a distributed system, or a server incorporating a blockchain.

According to the technical solution of the embodiments of the disclosure, the detection precision of the target information is improved, so that the vehicle information is accurately detected based on the monocular image. Since the radar point cloud data does not need to be relied on, the cost of accurately detecting the vehicle information is remarkably reduced.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A vehicle information detection method, comprising:
performing a first target detection operation based on an image of a target vehicle, to obtain a first detection result for target information of the target vehicle;
performing an error detection operation based on the first detection result, to obtain error information; and
performing a second target detection operation based on the first detection result and the error information, to obtain a second detection result for the target information;
fusing the first detection result and the second detection result based on the error information, to obtain a third detection result for the target information;
wherein the fusing the first detection result and the second detection result based on the error information, to obtain the third detection result for the target information comprises:
obtaining a first weight negatively correlated with the error information and a second weight positively correlated with the error information based on the error information;
taking the first weight as a weight of the first detection result;
taking the second weight as a weight of the second detection result; and
performing weighted addition on the first detection result and the second detection result based on the weight of the first detection result and the weight of the second detection result, to obtain the third detection result for the target information.

2. The method of claim 1, wherein the first detection result comprises a target feature map corresponding to the image, and the error information comprises an error prediction map; and
the performing the second target detection operation based on the first detection result and the error information, to obtain the second detection result for the target information comprises:
performing channel connection on the target feature map corresponding to the image and the error prediction map to obtain an input feature map; and performing the second target detection operation on the input feature map to obtain the second detection result for the target information.

3. The method of claim 1, wherein the target information comprises an offset of a bottom surface center point of the target vehicle; and the method further comprises:

obtaining a ground equation and a two-dimensional detection box of the target vehicle in the image;

obtaining coordinates of a projection point of the bottom surface center point in the image according to the third detection result of the offset and the two-dimensional detection box;

obtaining depth information of the bottom surface center point according to the coordinates of the projection point and the ground equation; and obtaining a detection result for an actual position of the bottom surface center point according to the coordinates of the projection point, the depth information, and a camera parameter corresponding to the image.

4. The method of claim 3, further comprising:

obtaining height information of the target vehicle; and obtaining a detection result for an actual position of the target vehicle according to the detection result for the actual position of the bottom surface center point and the height information of the target vehicle.

5. A method for training a vehicle information detection model, comprising:

obtaining target information of a plurality of vehicles based on radar point cloud data of the plurality of vehicles; and training based on the target information of the plurality of vehicles and images of the plurality of vehicles to obtain a vehicle detection model, wherein the vehicle detection model is used for obtaining a detection result for target information of a target vehicle based on an image of the target vehicle;

wherein the obtaining target information of the plurality of vehicles based on the radar point cloud data of the plurality of vehicles comprises:

obtaining three-dimensional detection boxes of the plurality of vehicles in a radar coordinate system based on the radar point cloud data of the plurality of vehicles;

calculating coordinates of projection points of respective vertexes and bottom surface center points of the three-dimensional detection boxes of the plurality of vehicles in the images according to the three-dimensional detection boxes of the plurality of vehicles in the radar coordinate system, a pre-configured radar parameter and a camera parameter;

obtaining two-dimensional detection boxes of the plurality of vehicles according to the coordinates of the projection points of the respective vertexes of the three-dimensional detection boxes of the plurality of vehicles in the images; and obtaining offsets of the bottom surface center points of the plurality of vehicles according to the coordinates of the projection points of the bottom surface center points of the three-dimensional detection boxes of the plurality of vehicles in the images and the two-dimensional detection boxes of the plurality of vehicles.

6. An electronic device, comprising:

at least one processor; and a memory communicatively connected to the at least one processor, wherein the memory stores instructions executable by the at least one processor, and the instruction is executed by the at least one processor to enable the at least one processor to perform operations of:

performing a first target detection operation based on an image of a target vehicle, to obtain a first detection result for target information of the target vehicle;

performing an error detection operation based on the first detection result, to obtain error information; and performing a second target detection operation based on the first detection result and the error information, to obtain a second detection result for the target information;

fusing the first detection result and the second detection result based on the error information, to obtain a third detection result for the target information;

wherein the fusing the first detection result and the second detection result based on the error information, to obtain the third detection result for the target information comprises:

obtaining a first weight negatively correlated with the error information and a second weight positively correlated with the error information based on the error information;

taking the first weight as a weight of the first detection result;

taking the second weight as a weight of the second detection result; and performing weighted addition on the first detection result and the second detection result based on the weight of the first detection result and the weight of the second detection result, to obtain the third detection result for the target information.

7. The electronic device of claim 6, wherein the first detection result comprises a target feature map corresponding to the image, and the error information comprises an error prediction map; and the performing the second target detection operation based on the first detection result and the error information, to obtain the second detection result for the target information comprises:

performing channel connection on the target feature map corresponding to the image and the error prediction map to obtain an input feature map; and performing the second target detection operation on the input feature map to obtain the second detection result for the target information.

8. The electronic device of claim 6, wherein the target information comprises an offset of a bottom surface center point of the target vehicle; and wherein the instruction is executed by the at least one processor to enable the at least one processor to further perform operations of:

obtaining a ground equation and a two-dimensional detection box of the target vehicle in the image;

obtaining coordinates of a projection point of the bottom surface center point in the image according to the third detection result of the offset and the two-dimensional detection box;

obtaining depth information of the bottom surface center point according to the coordinates of the projection point and the ground equation; and obtaining a detection result for an actual position of the bottom surface center point according to the coordinates of the projection point, the depth information, and a camera parameter corresponding to the image.

9. The electronic device of claim 8, wherein the instruction is executed by the at least one processor to enable the at least one processor to further perform operations of:
obtaining height information of the target vehicle; and
obtaining a detection result for an actual position of the target vehicle according to the detection result for the actual position of the bottom surface center point and the height information of the target vehicle.

10. An electronic device, comprising:
at least one processor; and
a memory communicatively connected to the at least one processor, wherein
the memory stores instructions executable by the at least one processor, and the instruction is executed by the at least one processor to enable the at least one processor to perform operations of:
obtaining target information of a plurality of vehicles based on radar point cloud data of the plurality of vehicles; and
training based on the target information of the plurality of vehicles and images of the plurality of vehicles to obtain a vehicle detection model, wherein the vehicle detection model is used for obtaining a detection result for target information of a target vehicle based on an image of the target vehicle;
wherein the obtaining target information of the plurality of vehicles based on the radar point cloud data of the plurality of vehicles comprises:
obtaining three-dimensional detection boxes of the plurality of vehicles in a radar coordinate system based on the radar point cloud data of the plurality of vehicles;
calculating coordinates of projection points of respective vertexes and bottom surface center points of the three-dimensional detection boxes of the plurality of vehicles in the images according to the three-dimensional detection boxes of the plurality of vehicles in the radar coordinate system, a pre-configured radar parameter and a camera parameter;
obtaining two-dimensional detection boxes of the plurality of vehicles according to the coordinates of the projection points of the respective vertexes of the three-dimensional detection boxes of the plurality of vehicles in the images; and
obtaining offsets of the bottom surface center points of the plurality of vehicles according to the coordinates of the projection points of the bottom surface center points of the three-dimensional detection boxes of the plurality of vehicles in the images and the two-dimensional detection boxes of the plurality of vehicles.

11. A non-transitory computer-readable storage medium storing computer instructions, wherein the computer instructions cause a computer to perform operations of:
performing a first target detection operation based on an image of a target vehicle, to obtain a first detection result for target information of the target vehicle;
performing an error detection operation based on the first detection result, to obtain error information; and
performing a second target detection operation based on the first detection result and the error information, to obtain a second detection result for the target information;
fusing the first detection result and the second detection result based on the error information, to obtain a third detection result for the target information;
wherein the fusing the first detection result and the second detection result based on the error information, to obtain the third detection result for the target information comprises:
obtaining a first weight negatively correlated with the error information and a second weight positively correlated with the error information based on the error information;
taking the first weight as a weight of the first detection result;
taking the second weight as a weight of the second detection result; and
performing weighted addition on the first detection result and the second detection result based on the weight of the first detection result and the weight of the second detection result, to obtain the third detection result for the target information.

12. A non-transitory computer-readable storage medium storing computer instructions, wherein the computer instructions cause a computer to perform operations of:
obtaining target information of a plurality of vehicles based on radar point cloud data of the plurality of vehicles; and
training based on the target information of the plurality of vehicles and images of the plurality of vehicles to obtain a vehicle detection model, wherein the vehicle detection model is used for obtaining a detection result for target information of a target vehicle based on an image of the target vehicle;
wherein the obtaining target information of the plurality of vehicles based on the radar point cloud data of the plurality of vehicles comprises:
obtaining three-dimensional detection boxes of the plurality of vehicles in a radar coordinate system based on the radar point cloud data of the plurality of vehicles;
calculating coordinates of projection points of respective vertexes and bottom surface center points of the three-dimensional detection boxes of the plurality of vehicles in the images according to the three-dimensional detection boxes of the plurality of vehicles in the radar coordinate system, a pre-configured radar parameter and a camera parameter;
obtaining two-dimensional detection boxes of the plurality of vehicles according to the coordinates of the projection points of the respective vertexes of the three-dimensional detection boxes of the plurality of vehicles in the images; and
obtaining offsets of the bottom surface center points of the plurality of vehicles according to the coordinates of the projection points of the bottom surface center points of the three-dimensional detection boxes of the plurality of vehicles in the images and the two-dimensional detection boxes of the plurality of vehicles.

* * * * *